Figure 1:
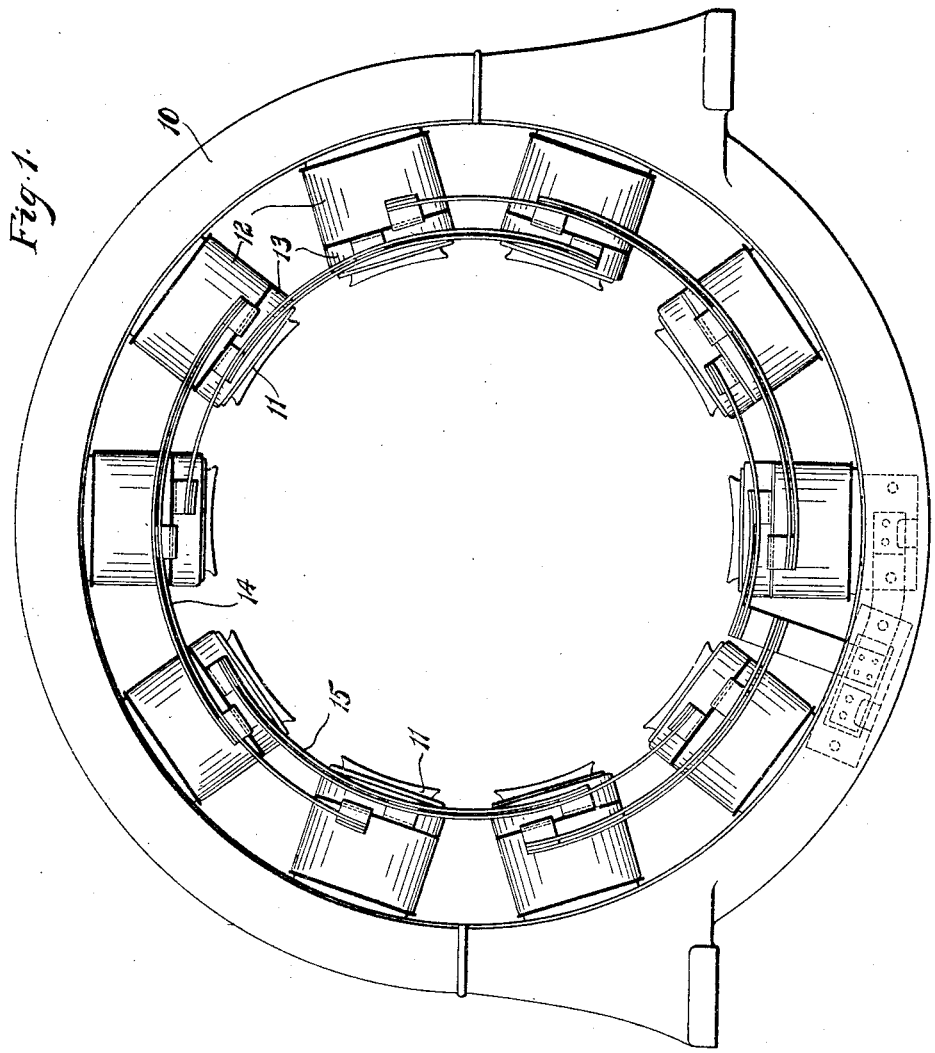

No. 858,097. PATENTED JUNE 25, 1907.
B. T. McCORMICK.
DYNAMO ELECTRIC MACHINE.
APPLICATION FILED SEPT. 14, 1905.

2 SHEETS—SHEET 1.

Witnesses:
George J. Schwarz
Fred J. Kinsey

Inventor:
Bradley T. McCormick.
By
Chas. E. Lord
Attorney.

No. 858,097. PATENTED JUNE 25, 1907.
B. T. McCORMICK.
DYNAMO ELECTRIC MACHINE.
APPLICATION FILED SEPT. 14, 1905.
2 SHEETS—SHEET 2.
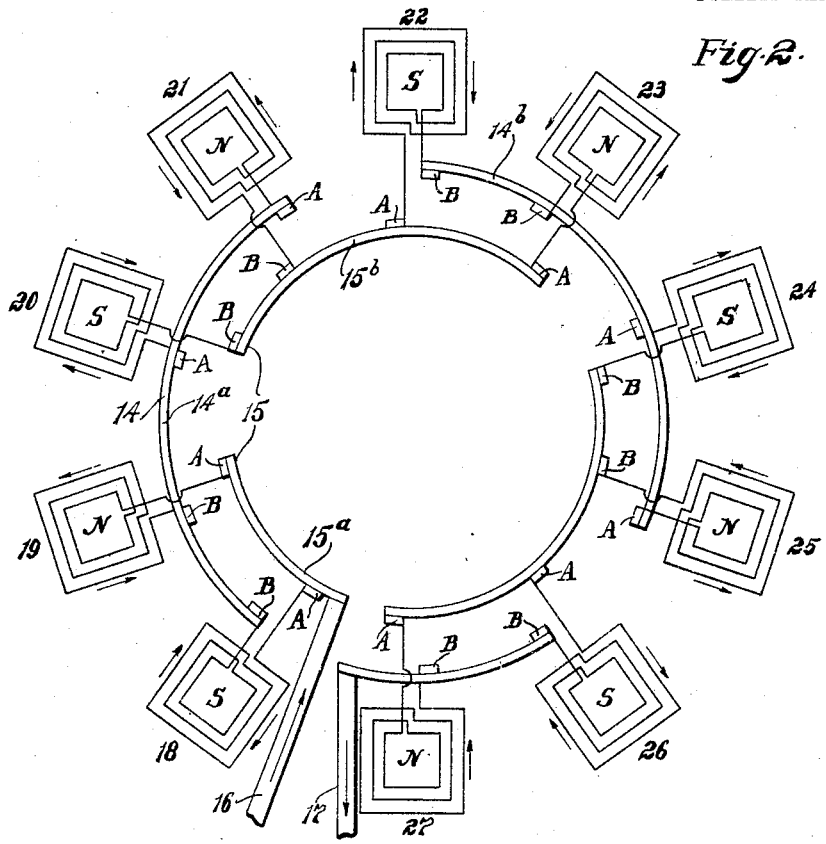
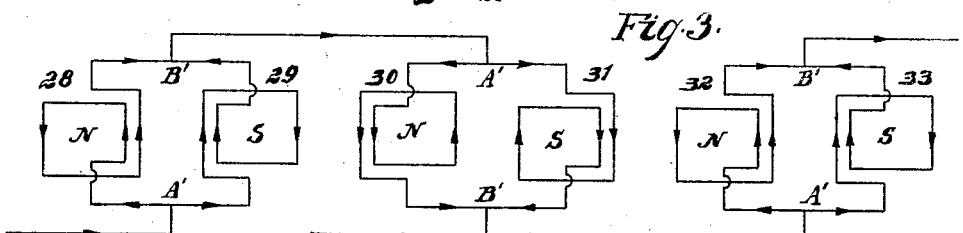
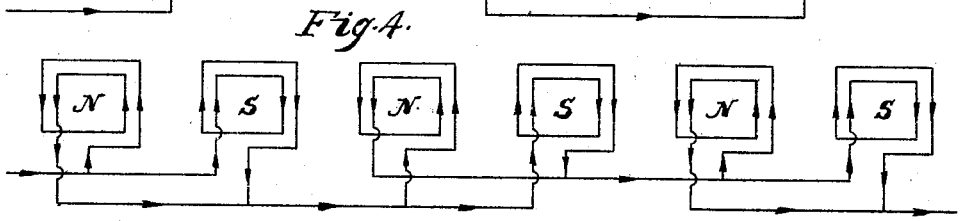
Witnesses:
George J. Schwartz
Fred J. Kinsey
Inventor:
Bradley T. McCormick.
By
Chas. E. Lord
Attorney.

UNITED STATES PATENT OFFICE.

BRADLEY T. McCORMICK, OF CINCINNATI, OHIO, ASSIGNOR TO THE BULLOCK ELECTRIC MANUFACTURING COMPANY, A CORPORATION OF OHIO.

DYNAMO-ELECTRIC MACHINE.

No. 858,097.   Specification of Letters Patent.   Patented June 25, 1907.

Application filed September 14, 1905. Serial No. 278,487.

*To all whom it may concern:*

Be it known that I, BRADLEY T. McCOR-MICK, a citizen of the United States, residing at Cincinnati, in the county of Hamilton and State of Ohio, have invented certain new and useful Improvements in Dynamo-Electric Machines, of which the following is a full, clear, and exact specification.

This invention relates to dynamo electric machines and especially to the arrangement and connections of the series field winding of such machines.

In large compound wound multipolar machines generating currents of high amperage, trouble has been experienced on account of the unbalanced magnetic condition of the fields due to the arrangement of the series winding and its connections. When the series winding carries currents of high amperage, very few series turns are required on the field poles to give the proper ampere turns to produce the required magnetic flux. Consequently if there is not exactly the same number of turns between each pair of poles there will be unbalanced magnetic fields about the armature, the pair or pairs of poles between which are the greatest number of turns, carrying the greatest number of lines of force. The result is that the different armature conductors will sweep through fields of different intensities causing cross currents in the armature between the brushes.

One of the objects of my invention is therefore to so arrange and connect the coils of the series winding that the magnetic field flux between each pair of poles will be the same.

A further object is to provide a novel means for connecting the series coils in multiple-series.

With these objects in view I wind and connect the series coils in multiple series with all the positive and negative coil terminals on the same side of the machine, so that there is an equal number of conductors between adjacent poles.

More specifically considered my invention consists of a compound wound dynamo electric machine the series winding of which comprises coils connected in multiple series by means of segmental strap connectors arranged on one side of the machine, the segments of said connectors having overlapping ends, each pair of multiple connected coils having positive terminals connected to one segment and negative terminals connected to the overlapping end of an adjacent segment, the adjacent pair of coils having positive terminals connected to the second segment and negative terminals connected to a third segment which overlaps the second segment, whereby the pairs of coils are connected in series and between each pair of poles there is an equal number of conductors.

My invention further consists in the combinations and arrangements of elements described in the specification and set forth in the appended claims.

For a more complete understanding of my invention, reference is had to the accompanying drawings, in which Figure 1 is an elevation of a ten pole field magnet equipped with my invention; Fig. 2 is a diagrammatic representation of the series field windings showing more clearly the connections between the same; Fig. 3 is a diagram showing unbalanced parallel field windings; and Fig. 4 is a diagram showing balanced parallel field windings, the coils being connected according to my invention.

I have shown at 10 a field frame having radial field poles 11 on which are wound the shunt coils 12 and series coils 13. It will be seen from this figure that all the connections are made on one side of the machine. The coils are here connected in multiple-series, that is, the adjacent pairs of coils are connected in multiple, and the pairs are connected in series.

Referring especially to Fig. 2 it is seen that the connectors are arranged in two different concentric circles 14 and 15. The main leads are indicated at 16 and 17 respectively and the positive and negative coil terminals at A and B respectively. Coils 18, 19, 22, 23, 26 and 27 have positive terminals connected to the inner set of connectors and coils 20, 21 24 and 25 have positive terminals connected to the outer set of connectors. It will be seen from this figure that between each pair of poles there is an equal number of conductors.

Referring to Fig. 3, it will be seen that there is an unbalanced condition of the field windings. Six coils are here shown connected in multiple-series as in the preceding figure. In this figure each coil has one and a half turns and the positive terminal A' and negative terminal B' of each coil are on different sides of the machine. The positive terminals A' of coils 28, 29, 32 and 33 are on one side of the machine and the positive terminals of coils 30 and 31 are on the opposite side of the machine. This arrangement results in an unequal number of conductors between poles and therefore unequal magnetic fields between the adjacent poles. From the center of coil 29 to the center of coil 30 there are three conductors and between the centers of the succeeding pairs of coils there are respectively two conductors, three conductors, four conductors and two conductors. Therefore the magnetic fields produced by coils 28—29, 29—30, 30—31, 31—32, 32—33 and 33—28, will be, respectively, proportional to four, three, two, three, four and two. Therefore in a machine wound as here shown the armature conductors will sweep through fields of widely different intensities causing potential differences between the brushes of the machine, and hence the cross currents in the armature winding.

In Fig. 4 I have shown the series windings of a six pole machine connected in accordance with my invention. As in the former case the coils are connected in multiple series, that is, each pair of windings are connected in multiple and the pairs are connected in series. Both the positive and negative terminals are on the same side of the coils resulting in an equal number of conductors between the centers of all the successive coils. Therefore in a machine having series coils connected as here shown there will result equal magnetic fields between every adjacent pair of poles.

Referring again to Figs. 1 and 2 it is seen that the sets of connectors arranged with overlapping ends provide a very good means for connecting the coils in multiple-series. Starting from the terminal 16 of the machine, the positive terminals of coils 18 and 19 are connected to segment 15$^a$ of one set, and the negative terminals of the same coils are connected to segment 14$^a$ of the other set. The adjacent pair of coils 20 and 21 have positive terminals connected to the same segment 14$^a$ and negative terminals connected to segment 15$^b$. Coils 22 and 23 have positive terminals connected to segment 15$^b$ and negative terminals connected to segment 14$^b$. The other pairs of coils are connected in a similar manner around the entire field. Thus it is seen that by this arrangement the coils of each pair are connected in multiple and the pairs are connected in series. Furthermore by arranging the connections all on one side of the machine the magnetic fields will be balanced.

What I claim as new and desire to secure by Letters Patent is:—

1. In a dynamo electric machine, field poles having series windings, the coils of the series winding being connected in multiple-series, and connectors for the coils, all the connectors being on the same side of the machine.

2. In a dynamo electric machine, field poles having a series winding the coils of which are connected in multiple-series, and connectors for the coils arranged approximately in two concentric circles on one side of the machine.

3. In a compound wound dynamo electric machine, field poles having series coils connected in multiple-series, and segmental strap connectors, each pair of coils on adjacent poles being wound in multiple and having their positive terminals connected to one segment and their negative terminals connected to another segment of said strap connectors.

4. In a compound wound dynamo electric machine, field poles having series coils connected in multiple-series, and two sets of segmental strap connectors for the series coils, the sets being arranged on one side of the machine in two concentric circles, the segments of one set overlapping the segments of the other set.

5. In a dynamo electric machine, a series field winding comprising coils connected in multiple-series, and segmental strap connectors for the coils, the positive terminals of one pair of multiple connected coils and the negative terminals of another pair of multiple connected coils being connected to the same segment.

6. In a dynamo electric machine, field poles, a series winding thereon the coils of which are connected in multiple-series, and segmental strap connectors for said coils arranged on one side of the machine, the segments having overlapping ends, the positive terminals of one pair of multiple connected coils and the negative terminals of another pair of multiple connected coils being connected to one segment, and the negative terminals of the first pair of coils and the positive terminals of the second pair of coils being connected respectively to the overlapping ends of oppositely extending adjacent segments.

7. In a compound wound dynamo electric machine, field poles, a series winding thereon having coils connected in multiple series, and segmental strap connectors for said coils arranged on one side of the machine, the segments of said connectors having overlapping ends, each pair of multiple connected coils having positive terminals connected to one segment and negative terminals connected to the overlapping ends of an adjacent segment, the adjacent pair of coils having positive terminals connected to the second segment and negative terminals connected to a third segment which overlaps the second segment, whereby the pairs of coils are connected in series, and between each pair of poles there is an equal number of turns.

In testimony whereof I affix my signature, in the presence of two witnesses.

BRADLEY T. McCORMICK.

Witnesses:
 ARTHUR F. KWIS,
 FRED J. KINSEY.